(12) United States Patent
Tan

(10) Patent No.: US 8,893,877 B2
(45) Date of Patent: Nov. 25, 2014

(54) BAGGAGE DEPOSIT SYSTEM

(75) Inventor: Michael Kim Tan, Zuid Beijerland (NL)

(73) Assignee: Scarabee ID B.V., Rotterdam (NL)

( * ) Notice: Subject to any disclaimer, the term of this patent is extended or adjusted under 35 U.S.C. 154(b) by 442 days.

(21) Appl. No.: 12/521,128

(22) PCT Filed: Jan. 7, 2008

(86) PCT No.: PCT/NL2008/000004
§ 371 (c)(1),
(2), (4) Date: Jul. 16, 2009

(87) PCT Pub. No.: WO2008/082300
PCT Pub. Date: Jul. 10, 2008

(65) Prior Publication Data
US 2010/0018839 A1 Jan. 28, 2010

(30) Foreign Application Priority Data

Jan. 5, 2007 (NL) .................................... 1033178

(51) Int. Cl.
*B65G 43/00* (2006.01)
*B64F 1/36* (2006.01)

(52) U.S. Cl.
CPC ..................................... *B64F 1/366* (2013.01)
USPC ........ 198/463.6; 198/340; 198/602; 414/217; 378/208

(58) Field of Classification Search
USPC .......................... 378/208, 206; 198/340, 463.6
See application file for complete search history.

(56) References Cited

U.S. PATENT DOCUMENTS

| | | | |
|---|---|---|---|
| 3,752,312 A * | 8/1973 | Soltanoff | 209/3.3 |
| 3,982,750 A | 9/1976 | Pulda | |
| 4,062,518 A * | 12/1977 | Stivender et al. | 250/519.1 |
| 4,357,535 A * | 11/1982 | Haas | 378/57 |
| 4,414,566 A * | 11/1983 | Peyton et al. | 382/142 |
| 4,617,681 A * | 10/1986 | LaFiandra et al. | 378/34 |
| 4,634,849 A * | 1/1987 | Klingen | 235/487 |
| 4,783,794 A * | 11/1988 | Dietrich | 378/57 |
| 4,805,202 A * | 2/1989 | Deucher et al. | 378/209 |
| 5,079,729 A * | 1/1992 | Nowakowski | 700/279 |
| 5,114,662 A * | 5/1992 | Gozani et al. | 376/159 |

(Continued)

FOREIGN PATENT DOCUMENTS

| | | |
|---|---|---|
| DE | 3844596 A1 | 12/1989 |
| EP | 0047659 A2 | 3/1982 |

(Continued)

*Primary Examiner* — Joseph Dillon, Jr.
(74) *Attorney, Agent, or Firm* — Hoffmann & Baron, LLP

(57) ABSTRACT

In a device (4) for receiving a piece of baggage (2) for transport, for example at an airport, the device comprises a receiving room (18A) with an infeed opening and a discharge opening. The receiving room is provided with a closing assembly, the closing assembly comprising a closing mechanism (22, 24). The device furthermore comprises a conveyor unit (16, 20) for discharging the piece of baggage from the receiving room through the discharge opening. The closing assembly is equipped at any time to keep at least one or other of the infeed opening and the discharge opening closed. In this way a device according to the invention is equipped to protect deposited baggage from third parties and to prevent persons from following the piece of baggage to the areas not accessible to the public. The present invention also provides a method for receiving a piece of baggage, which method is in accordance with the functioning of the above-mentioned device.

18 Claims, 9 Drawing Sheets

(56) References Cited

U.S. PATENT DOCUMENTS

| | | | |
|---|---|---|---|
| 5,540,301 A * | 7/1996 | Dumont | 186/61 |
| 5,668,342 A * | 9/1997 | Discher | 86/50 |
| 5,793,639 A | 8/1998 | Yamazaki | |
| 5,898,179 A * | 4/1999 | Smick et al. | 250/492.21 |
| 5,920,053 A * | 7/1999 | DeBrouse | 235/375 |
| 6,018,562 A * | 1/2000 | Willson | 378/9 |
| 6,088,423 A * | 7/2000 | Krug et al. | 378/57 |
| 6,220,422 B1 * | 4/2001 | Lee | 198/370.07 |
| 6,304,629 B1 * | 10/2001 | Conway et al. | 378/68 |
| 6,317,509 B1 * | 11/2001 | Simanovsky et al. | 382/131 |
| 6,663,280 B2 * | 12/2003 | Doenges | 378/203 |
| 6,946,300 B2 * | 9/2005 | Nguyen et al. | 436/110 |
| 6,952,163 B2 * | 10/2005 | Huey et al. | 340/521 |
| 6,974,928 B2 * | 12/2005 | Bloom | 209/583 |
| 7,055,672 B2 * | 6/2006 | Holmgren | 198/444 |
| 7,062,011 B1 * | 6/2006 | Tybinkowski et al. | 378/57 |
| 7,233,644 B1 * | 6/2007 | Bendahan et al. | 378/57 |
| 7,253,727 B2 * | 8/2007 | Jenkins et al. | 340/522 |
| 7,260,173 B2 * | 8/2007 | Wakayama et al. | 378/19 |
| 7,270,227 B2 * | 9/2007 | Bender et al. | 198/358 |
| 7,286,634 B2 * | 10/2007 | Sommer et al. | 378/57 |
| 7,325,497 B2 * | 2/2008 | Ben-Ezra | 104/88.01 |
| 7,358,733 B2 * | 4/2008 | Clark et al. | 324/318 |
| 7,373,867 B2 * | 5/2008 | Ryan | 86/50 |
| 7,486,769 B2 * | 2/2009 | Brondo, Jr. | 378/57 |
| 7,522,053 B2 * | 4/2009 | Johnson et al. | 340/572.1 |
| 7,529,341 B2 * | 5/2009 | Schlomka et al. | 378/90 |
| 7,575,112 B2 * | 8/2009 | Lowes et al. | 198/358 |
| 7,577,234 B2 * | 8/2009 | Roe et al. | 378/57 |
| 7,579,845 B2 * | 8/2009 | Peschmann et al. | 324/637 |
| 7,614,585 B2 * | 11/2009 | McCoskey et al. | 244/137.1 |
| 7,720,194 B2 * | 5/2010 | Connelly et al. | 378/57 |
| 7,817,775 B2 * | 10/2010 | Kang et al. | 378/57 |
| 7,856,081 B2 * | 12/2010 | Peschmann | 378/57 |
| 7,869,566 B2 * | 1/2011 | Edic et al. | 378/57 |
| 7,876,879 B2 * | 1/2011 | Morton | 378/57 |
| 8,031,903 B2 * | 10/2011 | Paresi et al. | 382/100 |
| 2007/0200566 A1 * | 8/2007 | Clark et al. | 324/318 |
| 2008/0317216 A1 * | 12/2008 | Lifshitz et al. | 378/209 |
| 2010/0329432 A1 * | 12/2010 | Ivanov et al. | 378/207 |
| 2012/0099947 A1 * | 4/2012 | Heinz et al. | 414/13 |

FOREIGN PATENT DOCUMENTS

| | | |
|---|---|---|
| EP | 0 556 037 A1 | 2/1993 |
| FR | 2508532 | 12/1982 |
| FR | 2 804 404 A1 | 8/2001 |
| WO | 02/15115 A1 | 2/2002 |
| WO | 03087712 A1 | 10/2003 |
| WO | 2004/050480 A1 | 6/2004 |
| WO | 2005/087590 A1 | 9/2005 |

* cited by examiner

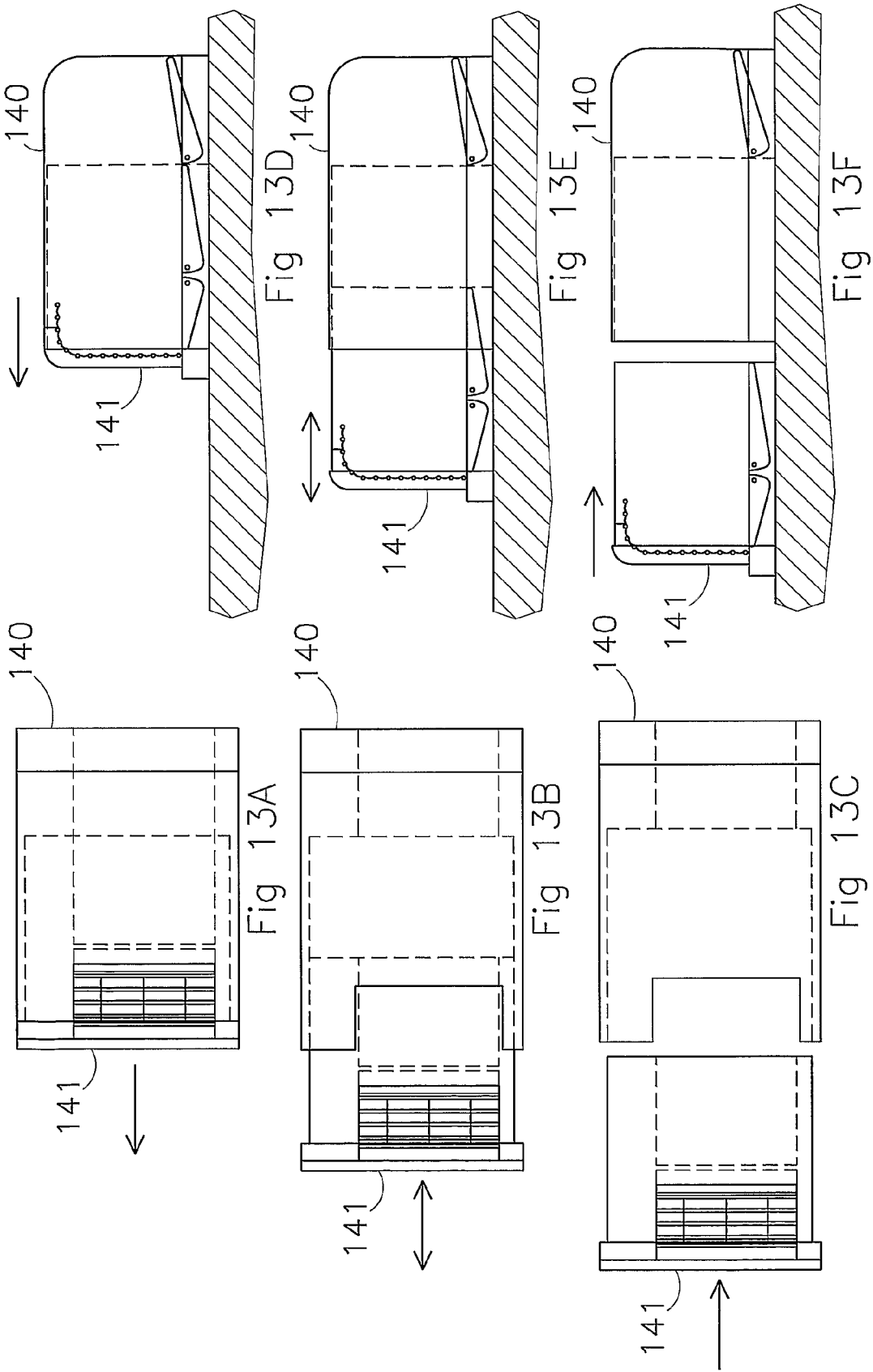

BAGGAGE DEPOSIT SYSTEM

CROSS-REFERENCE TO RELATED APPLICATIONS:

This application is the National Stage of International Application No. PCT/NL2008/000004, filed Jan. 7, 2008, which claims the benefit of Netherlands Application No. NL 1033178, filed Jan. 5, 2007, the contents of which is incorporated by reference herein.

FIELD OF THE INVENTION

The present invention relates to a baggage deposit system and a method for depositing baggage.

BACKGROUND OF THE INVENTION

At airports, passengers have to check in and deposit their baggage prior to their flight. Deposited baggage is furnished with a label and taken away on a conveyor system to a processing area. In the processing area the baggage is sorted on the basis of the affixed label, and is ultimately placed on board the correct aircraft.

Until recently, an employee of the airline concerned or a member of the ground staff handled the checking in and depositing of the baggage. At the present time, passengers who are taking only hand baggage can check in independently, in other words without the intervention of an employee of the airline or a member of the ground staff, using electronic systems. It is, however, still customary for the deposit of hold baggage for an employee of the airline or a member of the ground staff to take receipt of that baggage, assess it for weight, measurements and transportability and furnish it with a label.

The abovementioned known method of depositing baggage requires an employee of the airline or a member of the ground staff. To start with, that means wage costs. In addition, it has the further disadvantage that many employees of different airlines or members of ground staff with a corresponding number of desks are required in order to be able to carry out the method. On account of limited availability of desks and desk staff, long queues of waiting passengers can form. Expansion of handling capacity is usually hampered by the available space at the airport.

For the rest, a baggage deposit system in which a passenger can check in and deposit his baggage himself is known. In the case of this known system, however, supervision by airline staff or ground staff is still needed, inter alia because the deposit system involves only an adaptation of existing desks, which are not suitable for independent handling of baggage deposit without staff supervision.

A problem of the known desks is the open nature of the conveyance system. If no desk employee is present, there is insufficient means for preventing a passenger or the passenger's children from following the baggage and in this way gaining access to forbidden and/or dangerous territory, or to the baggage of others.

SUMMARY OF THE INVENTION

It is an object of the present application to provide a system and method for passengers to deposit baggage independently.

The object of the present invention is achieved by a device according to the present invention and a method according to the present invention.

According to the present invention, a piece of baggage is received in a receiving room of a device. This can be achieved by the passenger placing the piece of baggage directly in the receiving room, or by the passenger placing the piece of baggage at a receiving point, preferably on an upstream end of a conveyor unit, after which the conveyor unit conveys the piece of baggage into the receiving room. The receiving room has an infeed opening for receiving the piece of baggage and a discharge opening for discharging the piece of baggage after it has been received from a passenger. A conveyor unit provides for the discharge of the piece of baggage from the receiving room.

The receiving room is provided with a closing mechanism. The closing mechanism is designed in such a way that at any time at least one or other of the infeed opening and the discharge opening is closed by the closing mechanism. In this way the closing mechanism ensures that there can be no open connection through the receiving room. Once baggage has been fed in through the infeed opening, after closure of the infeed opening by the closing mechanism, the baggage can no longer be accessed by persons at an infeed side of the receiving room. While the infeed opening is closed, the discharge opening can be open, and the piece of baggage can be conveyed to an area which is not accessible to passengers, in which area, for example, a processing station is present for further handling, such as sorting and/or loading into the correct aircraft or other means of transport, or for temporary storage.

In one embodiment the device furthermore comprises means for determining a measurement and/or a weight and/or the transportability and/or the identification (on the basis of the baggage label) of the piece of baggage when the baggage has been placed in the receiving room. In general, only a limited quantity of baggage, usually determined by the weight, may be taken on board an aircraft. There are generally also restrictions on the measurements of baggage. The means for determining a measurement can be, for example, a scanning device with appropriate processing equipment. Other means for determining at least one measurement, preferably measurements in three dimensions, are known to the persons skilled in the art. Such means can, for example, function mechanically and/or optically. The measurements of the receiving room and/or the measurements around the receiving point can already impose limits on the piece of baggage to be fed in.

In addition, there can be restrictions with regard to the transportability of baggage. Irregularly shaped baggage, such as a ball, bicycle, skis etc. must not be transported automatically and is usually processed manually. The means for determining the transportability can be, for example, a scanning device with appropriate processing equipment. The transportability will usually be determined by a weighted combination of aspects such as measurements, weight, shape (three-dimensional contour) and area (two-dimensional surface).

In one embodiment at least one measurement and/or the weight of the piece of baggage is/are determined before the piece of baggage becomes inaccessible to the passenger. For example, a measurement and/or weight is/are determined when the piece of baggage is standing at the abovementioned receiving point. In this way it is possible to refuse pieces of baggage which are not permitted or which are not suitable for automatic handling already before the closing mechanism goes into operation. This makes it possible to save a considerable amount of time in cases where pieces of baggage not suitable for handling are presented.

In one embodiment the conveyor unit comprises a first and a second conveyor element, the first and second conveyor elements being placed one after the other in a direction of conveyance, and the abovementioned first and second conveyor elements each being capable of tilting in such a way that the first and second conveyor elements can assume an angle relative to each other, which angle can vary at least between 90° and 180°. In such an embodiment it is possible to convey the piece of baggage until it is against the second conveyor element, the second conveyor element being in a substantially vertical position, in other words at an angle of substantially 90° relative to the first conveyor element, which is in a substantially horizontal position. The first and the second conveyor elements can then be tilted until each conveyor element is at an angle of substantially 45° relative to a horizontal line, the angle between the first and the second conveyor elements remaining substantially 90°. After that, the first and the second conveyor elements can be tilted until they are each in a horizontal position. With such an embodiment of the device and the method, it is possible to place each piece of baggage in a position in which the piece of baggage has the lowest possible height and the piece of baggage is prevented from falling over accidentally on a conveyor belt or another similar conveyor unit.

In one embodiment the first and the second conveyor element can be tilted until either the first element is in a substantially vertical position and the second element is in a substantially horizontal position, or vice versa. If, for example, it is detected that the piece of baggage is provided with wheels, it may be important for the conveyance that the piece of baggage does not stand on its wheels, but on another surface, in order to ensure that the piece of baggage does not roll away. In this embodiment the piece of baggage can be forced onto one side without the piece of baggage being dropped onto that side, with the risk of the piece of baggage becoming damaged.

In one embodiment the receiving room is placed on a floor construction, and the conveyor unit is a lifting device, which is equipped to lower the piece of baggage from the receiving room until it is at least below the floor construction. This is a simple way of providing a device which requires little floor surface and can be set up in many places, while a good division between a public area above the floor construction which is accessible to passengers and an area below the floor construction which is not accessible to passengers is obtained. In particular, the piece of baggage is transferred below the floor construction to a further conveyor unit which is fixed on the underside of the abovementioned floor construction, in other words on the ceiling of the space not accessible to the public. In such an embodiment the available space and the available floor surface are used efficiently.

In one embodiment the conveyor unit comprises a device for conveying the piece of baggage from the receiving room to a possibly already existing discharge device, such as a conveyor belt. This is a simple way of providing a device which can connect to already existing infrastructure and can therefore replace existing handling desks.

In one embodiment the device furthermore comprises means for printing a baggage label and possibly means for affixing the baggage label on the piece of baggage. In a further embodiment the device furthermore comprises means for identifying the piece of baggage on the basis of the label affixed. The baggage label can be provided with, for example, a barcode and/or provided with an RFID circuit. An RFID circuit is known in the art and provides the possibility of receiving an identification signal from the RFID circuit without optical contact, as is required in the case of a barcode. In general, other identification elements can also be provided.

The device can also comprise means for examining the contents of the piece of baggage, for example by means of x-rays or another type of radiation, metal detection means and/or other examination means, which are known to the person skilled in the art. Such examination can be directed at illegal carrying of, for example, narcotic drugs and/or the presence of explosive materials and other materials which cannot be carried safely.

The device according to the invention can be described as a device for handling the receipt of a piece of baggage, comprising:
 a receiving room with an infeed opening and a discharge opening, and provided with a closing assembly, the closing assembly comprising a closing mechanism, and
 a conveyor unit for discharging the piece of baggage from the receiving room through the discharge opening, the closing assembly being equipped to
 close the discharge opening of the receiving room prior to opening the infeed opening of the receiving room in order to feed the piece of baggage into the receiving room, and
 close the infeed opening of the receiving room prior to opening the discharge opening in order to discharge the piece of baggage from the receiving room. The closing assembly is equipped so that at any time it keeps at least one or other of the infeed opening and the discharge opening closed.

The device according to the invention can be described in slightly alternative wording as a device for receiving a piece of baggage for transport, the device comprising:
 a receiving room with an infeed opening and a discharge opening, and provided with a closing assembly, the closing assembly comprising a closing mechanism, and
 a conveyor unit for discharging the piece of baggage from the receiving room through the discharge opening, the closing assembly being equipped so that at any time it keeps at least one or other of the infeed opening and the discharge opening closed.

The preferred embodiments of the device mentioned in the description and claims are applicable to the device according to both of the abovementioned wordings.

The invention also comprises a method for handling the receipt of a piece of baggage, the method comprising:
 infeed of the piece of baggage into a receiving room, the infeed comprising the steps of:
 closing a discharge opening of the receiving room prior to opening an infeed opening of the receiving room in order to feed the piece of baggage into the receiving room; and
 closing the infeed opening of the receiving room prior to opening the discharge opening in order to discharge the piece of baggage from the receiving room.

BRIEF DESCRIPTION OF THE DRAWINGS

The invention is described in greater detail below with reference to the appended drawings, which show non-limiting embodiments and in which:

FIGS. 13A-13F show diagrammatically a top and side view respectively of an embodiment of a device according to the invention.

DETAILED DESCRIPTION OF PREFERRED EMBODIMENTS

Figure 1:
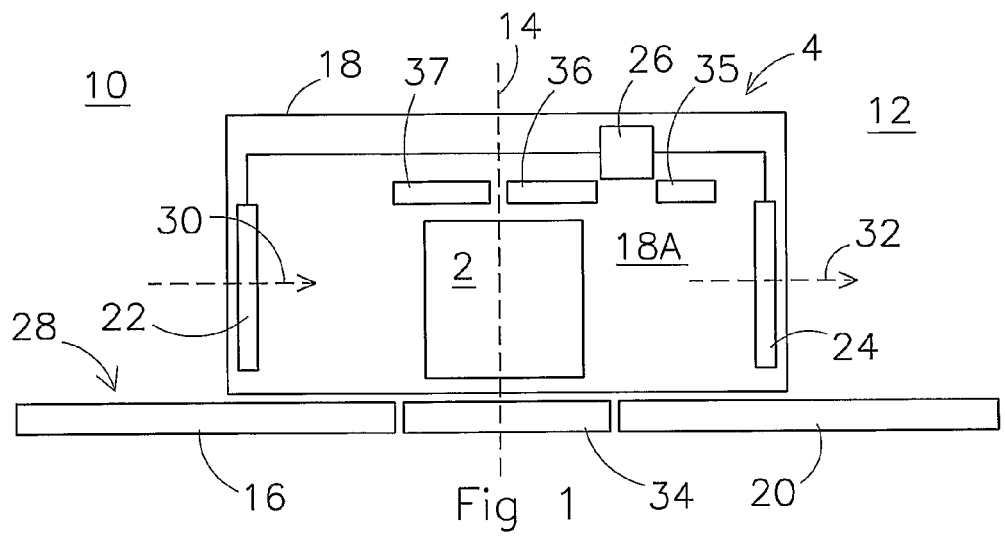
FIG. 1 shows diagrammatically a cross section of a first embodiment of the device according to the present invention.

The same reference numerals refer to the same parts in the drawings. FIG. 1 shows a first embodiment of a device 4 for receiving a piece of baggage 2, such as a suitcase, a travel bag, a box and/or any other suitable means for carrying materials such as baggage. The piece of baggage 2 is received from a passenger and is to be carried with the passenger to a destination in a means of transport such as an aircraft or a boat, bus or train. Of course, the device can also be used for other applications, such as for receiving articles for temporary storage in a depot or for receiving mail items or other articles for transport which are not being accompanied by the owner of the article.

The owner of the piece of baggage 2 can deposit his piece of baggage 2 at the device 4 in an area 10 which is accessible to the public, which device 4 receives the piece of baggage 2 and conveys it to a non-public area 12. The public area 10 and the non-public area 12 are separated, for example by means of a wall 14, the device 4 extending through the wall 14 and functioning as a lock.

The first embodiment of the device 4 illustrated comprises a first conveyor element 16 and a second conveyor element 20, which elements together form a conveyor unit. The device 4 furthermore comprises a housing 18, which has an internal receiving room 18A. A first closing mechanism 22 is equipped to close an infeed opening in the housing 18, and a second closing mechanism 24 is equipped to close a discharge opening in the housing 18. The first and second closing mechanisms 22, 24 are functionally connected by a control circuit 26. The control circuit 26 controls the first and second closing mechanisms 22, 24. In particular, the control circuit 26 ensures that at all times at least one or other of the first and the second closing mechanisms 22, 24 keeps the infeed opening or the discharge opening respectively closed, so that an open connection between the public area 10 and the non-public area 12 cannot arise.

At an upstream end 28 of the first conveyor element 16 is a receiving point where the piece of baggage 2 can be placed, after which the piece of baggage 2 can be conveyed through the infeed opening in the direction of infeed arrow 30 into the receiving room 18A. The piece of baggage 2 can then be conveyed through the discharge opening in the direction of discharge arrow 32 out of the receiving room 18A.

A weighing machine 34 for weighing the piece of baggage 2 can be provided in the receiving room 18A, for example as a part of the first conveyor element 16. In this way it can be determined whether a piece of baggage 2 meets the weight limits for transport, and subsequently in a handling procedure a number of pieces of baggage 2 can be distributed in a cargo compartment of, for example, an aircraft in such a way that an advantageous weight distribution is produced.

In the receiving room 18A means 35 can furthermore be provided for identifying the piece of baggage 2. In one embodiment the identification is performed optically on the basis of a barcode. In one embodiment the identification is performed on the basis of an RFID circuit, possibly in combination with an optical identification. Through the identification, it can be determined, for example, where the piece of baggage is to be conveyed.

In the receiving room 18A means 36 can furthermore be provided for determining one or more measurements of the piece of baggage 2. In one embodiment a full three-dimensional scan of the piece of baggage 2 is performed. By determining the measurement(s), it can be determined whether the piece of baggage 2 can be transported, and it can possibly be determined how subsequently in a handling procedure a number of pieces of baggage 2 can be stacked in an advantageous manner, so that as little space as possible is wasted in a cargo compartment of, for example, an aircraft.

In the receiving room 18A means 37 can furthermore be provided for determining the transportability of the piece of baggage 2. By determining the transportability, transport damage to the piece of baggage 2 or the device 4 can be prevented. The transportability of a piece of baggage 2 can depend upon a number of factors. Not all factors need necessarily be assessed, but at least one factor is assessed. Such factors comprise measurements, weight, shape, material properties, for example a risk of damage such as tearing, contents, for example explosives, weapons and/or forbidden agents. Other factors can also be assessed.

In operation, the device 4 functions as follows. A piece of baggage 2 is placed on the first conveyor element 16, on the upstream end 28 of said conveyor element. If the infeed opening is closed, the control circuit 26 will control the first closing mechanism 22 so that it opens access to the receiving room 18A. Should the discharge opening be open, the control circuit will first control the second closing mechanism 24 so that it closes the discharge opening before opening the infeed opening.

Before or after placing of the piece of baggage 2, a passenger may be asked for his travel document, for example a boarding card and/or his passport. These documents can be scanned by a device suitable for the purpose (not shown). In this way an identity of the passenger and/or a destination can be established, and a baggage label can be printed. The baggage label can be affixed on the piece of baggage 2 by the device 4 or by the passenger. If the passenger affixes the baggage label on the piece of baggage 2, means 35 for scanning the label can be provided in the receiving room 18A in order to check that the label is readable for subsequent scanning devices.

As soon as the infeed opening has opened, the piece of baggage 2 can be fed into the receiving room 18A by the first conveyor element 16 in the direction of infeed arrow 30. The device 4 can be provided with means for determining the weight and/or at least one measurement of the piece of baggage 2 before the piece of baggage 2 is fed into the receiving room 18A, for example while the piece of baggage 2 has been placed at the receiving point at the upstream end 28 of the first conveyor element 16. In this way it can be ensured that an unsuitable piece of baggage 2 is not fed into the receiving room 18A. This means that time is not wasted unnecessarily and damage to the piece of baggage 2 and/or the device 4 is prevented.

In the receiving room 18A the piece of baggage 2 can be checked thoroughly, for example with regard to weight, measurements, transportability, identifiability and/or contents. If all of the transport limits are not met with regard to weight, measurements, transportability, identifiability and/or contents, the piece of baggage 2 can be returned to the passenger through the infeed opening. During the check the infeed opening can have been closed by the first closing mechanism 22, or it can have remained open.

If the piece of baggage 2 is accepted, the control circuit 26 ensures that the first closing mechanism 22 closes the infeed opening and that the second closing mechanism 24 opens the discharge opening, so that the piece of baggage 2 can enter the non-public area 12.

In the period between the moment at which the first closing mechanism 22 closes the infeed opening and the moment at which the discharge opening is opened, it can be determined whether a living creature, for example an animal, a child or a person with malicious intent is present in the receiving room 18A. To this end, an infrared detection means, carbon dioxide detection means or a movement detection means can be provided in the receiving room 18A. If a living creature is detected, the infeed opening is opened again and the discharge opening remains closed, in order to ensure that an unauthorized person cannot deliberately or accidentally reach the non-public area 12.

After opening of the discharge opening, the second conveyor element 20 conveys the piece of baggage 2 into the non-public area 12. In the non-public area 12 the piece of baggage 2 is prepared further for transport, for example the piece of baggage 2 is placed in a suitable container or on a pallet. The piece of baggage 2 can be stored temporarily before it is made ready for transport and other operations can be carried out.

FIGS. 2A-2F show a second embodiment of a device 38 according to the invention. Furthermore, FIGS. 2A-2F show an embodiment of a method according to the invention. The device 38 comprises a housing 18, inside which the receiving room 18A is situated. A first conveyor element 40, a second conveyor element 42 and a third conveyor element 44 are provided on the underside of the receiving room 18A. The first and second conveyor elements 40, 42 are fixed so that they tilt. The third conveyor element 44 also functions as a lifting device. The third conveyor element 44 can furthermore serve as a temporary storage facility (buffer). A temporary storage function is desirable, for example, if a passenger is permitted to feed in two or more pieces of baggage 2. If the infeed is broken off after the infeed of one or more pieces of baggage 2, said pieces of baggage 2 already fed in earlier must be returned to the passenger. The third conveyor element 44 can furthermore be designed as a temporary storage facility and means of conveyance for conveying piece of baggage 2 out of the receiving room 18A on the rear side, so as to connect to already existing infrastructure (not shown here), such as an existing conveyor belt.

A closing mechanism 46 is equipped to close an infeed opening in the housing 18. The underside of the receiving room 18A in the embodiment shown is situated substantially flush with a floor construction 50, but can also be situated above the floor construction 50. The non-public area 12 is situated below the floor construction 50. A fourth conveyor element 48 is situated below the floor construction 50 in the non-public area 12.

Figure 2A:
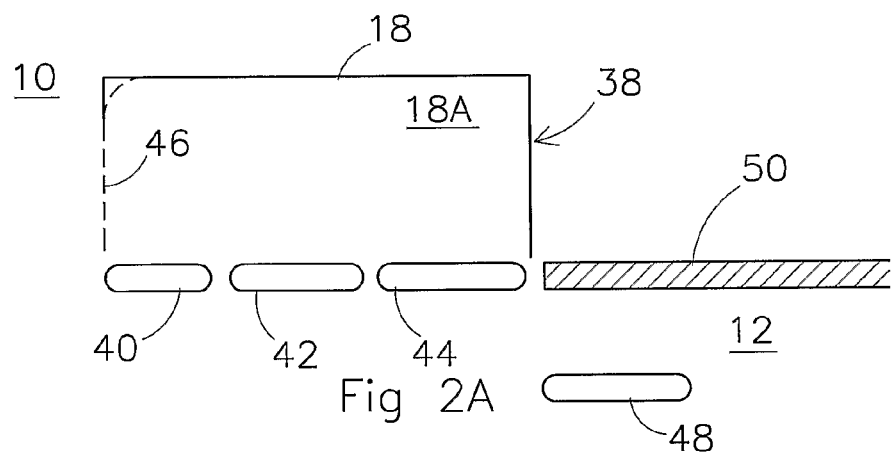
FIGS. 2A-2F show diagrammatically a cross section of a second embodiment of the device and an embodiment of the method according to the present invention.
Figure 2B:
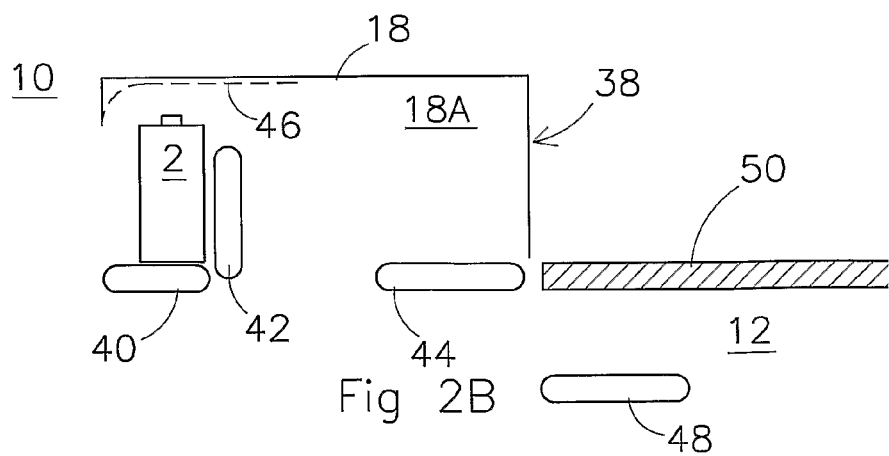

In operation, to begin with referring to FIG. 2B, a piece of baggage 2 can be fed into the receiving room 18A. At the moment of infeed, the closing mechanism 46 is in an open position. Furthermore, the second conveyor element 42 is in a tilted position which is such that the second conveyor element is in a substantially vertical position, while the first conveyor element 40 remains in a substantially horizontal position. The piece of baggage 2 is preferably fed in transversely, in other words with its largest measurement perpendicular to the plane of drawing. In one embodiment the first conveyor element 40 can be provided with means for rotating the piece of baggage 2 in such a way that the piece of baggage 2 ultimately goes into the desired orientation (for example, transverse). For example, the entire first conveyor element is rotatable.

The piece of baggage 2 is placed against the second conveyor element 42. For this purpose, the first conveyor element 40 can be turned on in order to move the piece of baggage 2 towards the second conveyor element 42 until the piece of baggage 2 is in contact with the second conveyor element 42. Starting from a substantially uniform weight distribution of the piece of baggage 2, a centre of gravity of the piece of baggage 2 in the position shown lies relatively high, and the piece of baggage 2 can fall relatively easily as a result of an uneven movement. In addition, the height of the piece of baggage 2 is still relatively great, so that above each conveyor unit which will convey the piece of baggage 2 a relatively large amount of space will have to be left clear. It would be more advantageous if the piece of baggage 2 shown were tilted. However, this is not necessarily true for every piece of baggage 2.

Figure 2C:
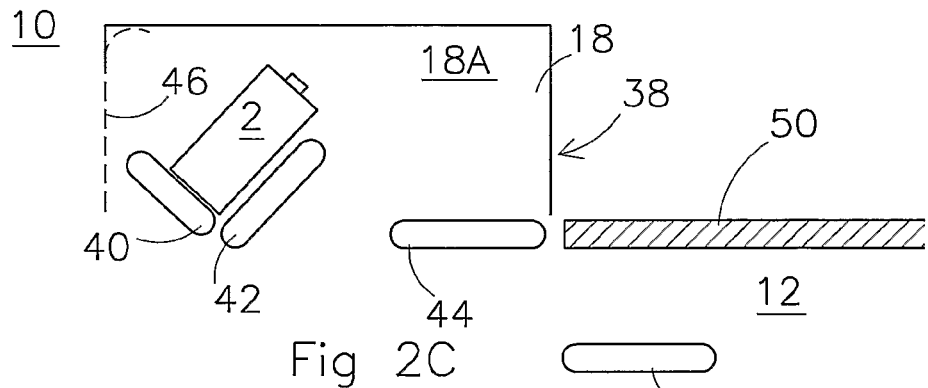
Figure 2D:
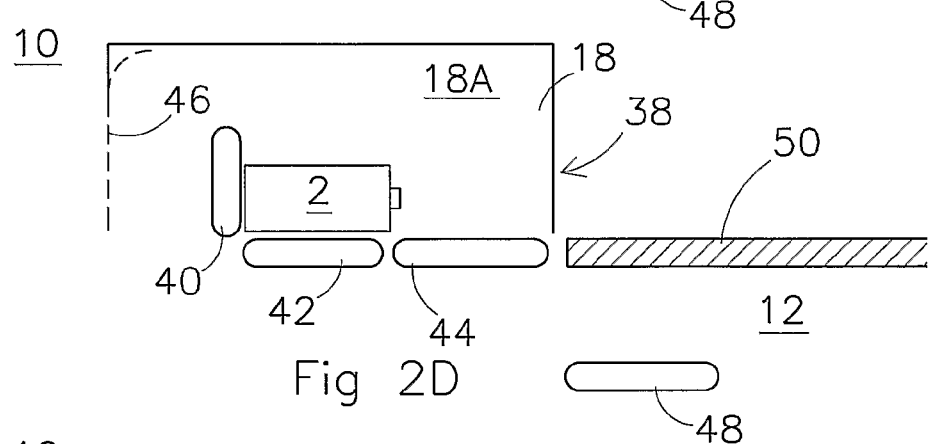

Referring now to FIG. 2C, after infeed of the piece of baggage 2, the infeed opening is closed by controlling the closing mechanism 46. In order to place the piece of baggage 2 in its most advantageous position with regard to its centre of gravity and/or height and/or best transportable side (for example, a side without wheels), both the first and the second conveyor elements 40, 42 tilt, while the angle between them remains substantially 90°, until both the first and the second conveyor elements 40, 42 are positioned at an angle of substantially 45° to an imaginary horizontal line. Referring to FIG. 2D, the first and the second conveyor elements 40, 42 then tilt until each is in a substantially horizontal position. The piece of baggage 2 will follow one of the conveyor elements 40, 42 here, the conveyor element at which the piece of baggage 2 arrives in a most stable position as regards gravity.

Figure 2E:
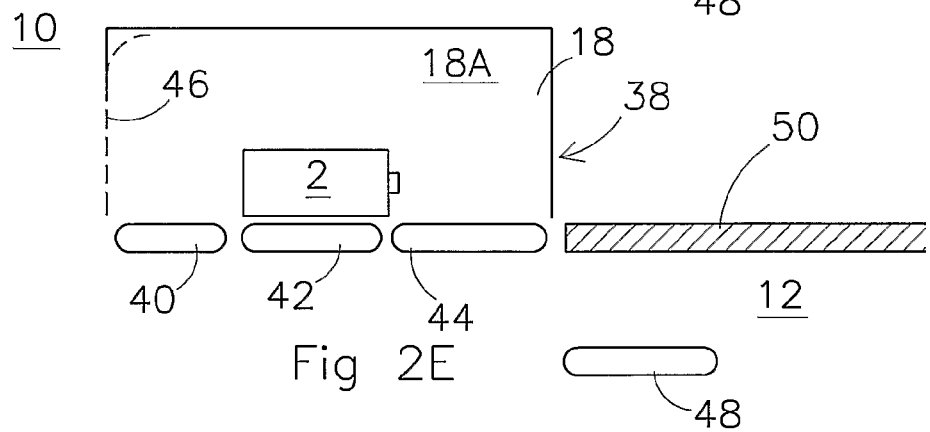

Referring to FIG. 2E, in one embodiment there can be a possibility of the first conveyor element 40 tilting to a substantially vertical position and the second conveyor element 42 tilting to a substantially horizontal position. The piece of baggage 2 will be forced to tilt here, and thus comes to rest in the best transportable position and orientation (for example, side without wheels).

Figure 2F:
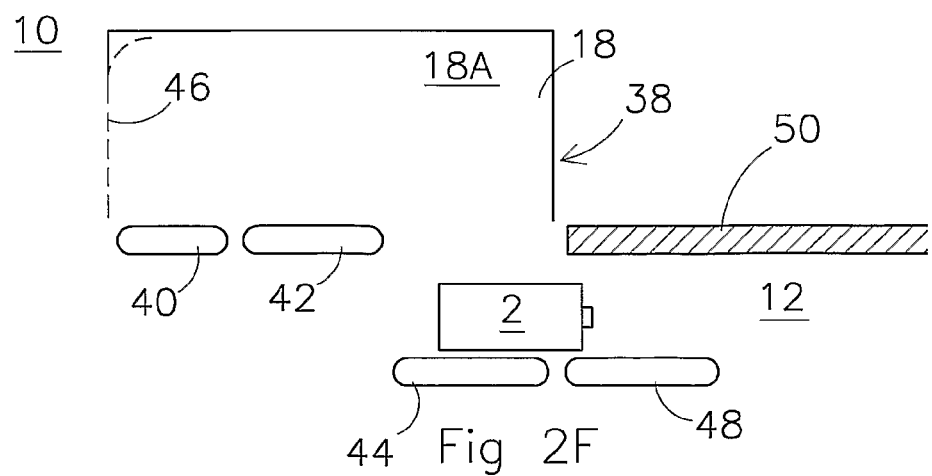

Finally, referring to FIG. 2F, the piece of baggage 2 is conveyed to the third conveyor element 44. The third conveyor element 44 is equipped to buffer the piece of baggage 2 and to lower it to a level below the floor construction 50, in particular to a level flush with a level of the fourth conveyor element 48. The fourth conveyor element 48 conveys the piece of baggage 2 further for further handling as described above with reference to FIG. 1.

This third conveyor element 44 can also be in the form of a conveyor means for buffering piece of baggage 2 and conveying it out of receiving room 18 at the rear side, in order to connect to already existing infrastructure (not shown here).

The fourth conveyor element 48 can be situated on a floor below the floor construction 50. Through the depositing of the piece of baggage 2, the fourth conveyor element 48 can, however, also hang below the floor construction 50. The low height of the pieces of baggage 2 means that only a small space is needed between the fourth conveyor element 48 and an object situated above it. In this way the non-public area 12 can be arranged efficiently.

In the embodiment shown the third conveyor element 44 can also function as a closing mechanism. For this purpose, the third conveyor element 44 can be situated at the level of the floor construction 50 when the closing mechanism 46 has been opened. In a similar way the second conveyor element 42 can also function as a closing mechanism. When the second conveyor element 42 is in the substantially vertical position, the receiving room 18A is not accessible to persons, and persons cannot reach the discharge opening. In this way the discharge opening is also effectively closed to the public.

It is furthermore pointed out that the method and device for tilting a piece of baggage 2 on the basis of its centre of gravity, as shown in FIGS. 2B-2D, can also be used for other purposes and in other devices, and are thus not limited to use in a device and method for receiving pieces of baggage according to the present invention.

It is furthermore pointed out that the method and device for controlled tilting of a piece of baggage 2, as shown in FIGS. 2B-2E, also permit the possible return of the piece of baggage 2 to the passenger, in such a way that the piece of baggage is returned in the same position as that when it was taken in.

Figure 3A:
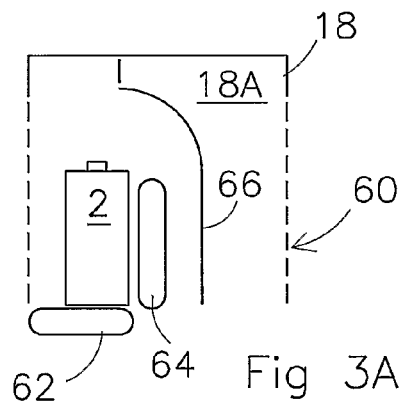
FIGS. 3A-3C show diagrammatically a cross section of a third embodiment of the device.
Figure 3B:
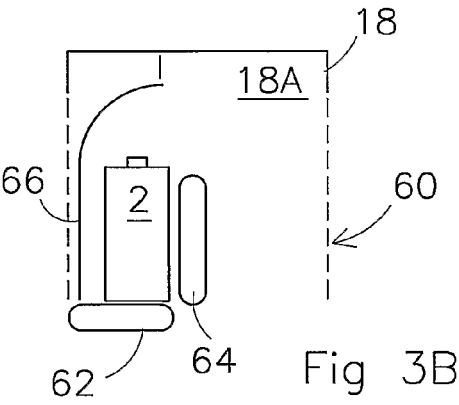
Figure 3C:
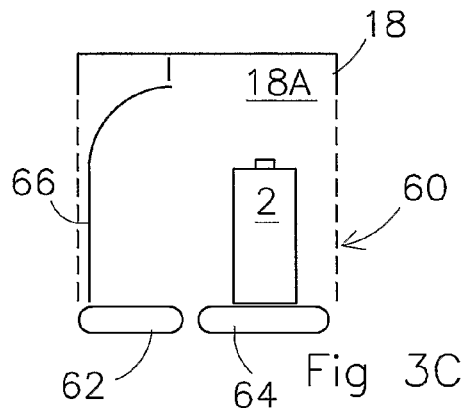

FIGS. 3A-3C show an embodiment of a closing mechanism 66 for use in a device according to the invention. In the embodiment of the device 60 shown a first conveyor element 62 and a second conveyor element 64 are provided in the bottom of the receiving room 18A in a housing 18. In FIG. 3A a piece of baggage 2 has been placed on the first conveyor element 62.

The closing mechanism 66 is a sliding door with a first position shown in FIG. 3A and a second position shown in FIGS. 3B and 3C. In the first position the closing mechanism 66 closes a discharge opening, while in the second position the closing mechanism 66 closes an infeed opening, and in the substantially vertical position conveyor element 64 provides for closure during the changing of position of the closing mechanism 66.

The closing mechanism 66 shown in FIGS. 3A-3C can be used in the embodiment according to FIG. 1 and/or the embodiment according to FIGS. 2A-2F instead of or in addition to the respective closing mechanisms 22, 24 (FIG. 1), 46, 42 and 44 (FIGS. 2A-2F). In particular, where it is used in the embodiment according to FIG. 1, it should be understood that the substantially vertical position of one of the conveyor elements for closing a discharge opening during the movement of the closing mechanism 66 can be omitted. If the discharge opening has to be closed fully, additional means can be used, or the closing mechanism can be designed in a suitable manner. For example, the closing mechanism 66 can be in the form of a generally known roller shutter, consisting of interconnected rigid segments, the segments resting upon each other when at rest and for movement being drawn apart, so that they can move relative to each other. In this way such a roller shutter has a greater length during movement from the first position to the second position, which greater length can be used advantageously in such an embodiment.

Figure 4A:
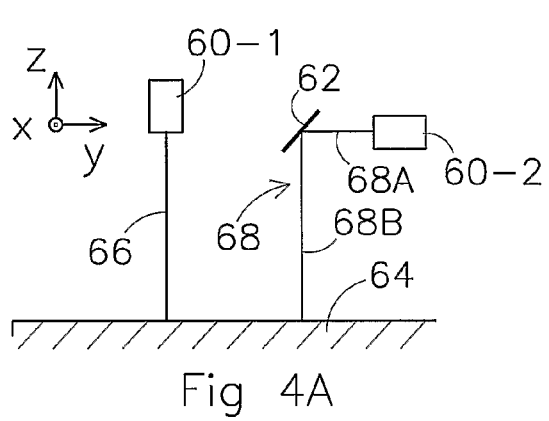
FIG. 4A shows diagrammatically a first and a second embodiment of a laser scanning device.

FIG. 4A shows on the left side a first embodiment of a laser scanning device, which first embodiment comprises a laser generation device 60-1. The laser generation device 60-1 generates a laser beam 66, by means of which an object can be scanned, for example by determining a distance between the laser generation device 60-1 and the object. The surface 64 can be a surface of an object or can be a surface of a supporting element on which an object is to be placed.

FIG. 4A shows on the right side a second embodiment of a laser scanning device, which second embodiment comprises a laser generation device 60-2 and a reflecting element 62. The laser generation device 60-2 generates a laser beam 68, a first part 68A of which strikes the reflecting element 62, for example a mirror or a prism, and is reflected by the reflecting element 62 in the direction of the surface 64. A second part 68B thus extends between the reflecting element 62 and the surface 64. Such an embodiment can advantageously be used in a small area, since the propagation path of the laser beam, which can require a minimum length, is divided into two parts 68A and 68B.

Figure 4B:
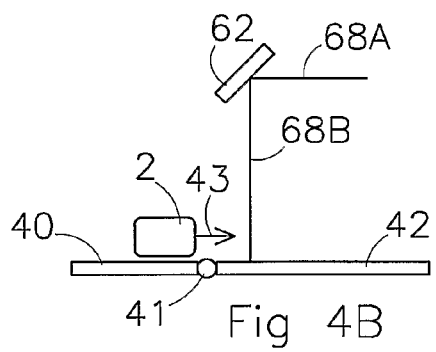
FIGS. 4B-4C illustrate diagrammatically a first embodiment of a method for scanning with a laser scanning device according to FIG. 4A.

FIG. 4B shows the functioning of the laser scanning device in the second embodiment, it being pointed out that the laser generation device (laser generation device 60-2 in FIG. 4A) is not shown. A first part 68A of a laser beam is reflected at a predetermined angle by a reflecting element 62 towards the surface of a second conveyor element 42. A first conveyor element 40 is positioned next to the second conveyor element 42. The first and second conveyor elements 40, 42 are rotatable about an axis of rotation 41, as described in relation to FIGS. 2A-2D. A piece of baggage 2, or any other object, is positioned on the first conveyor element 40 and is conveyed in the direction of the second conveyor element 42, as indicated by an arrow 43.

Figure 4C:
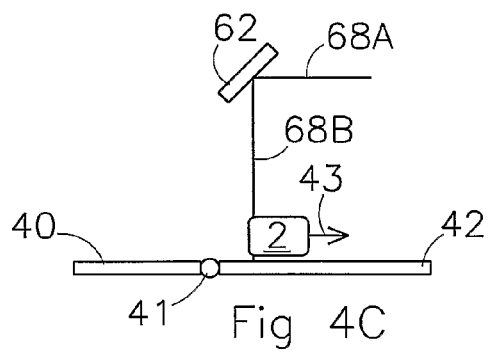

FIG. 4C shows the embodiment according to FIG. 4B, in which the piece of baggage 2 has moved along through the second part 68B of the laser beam. While the piece of baggage 2 is moving through the laser beam 68B, the laser beam 68B sweeps along the x-axis (see coordinates system shown in FIG. 4A), in other words in a direction substantially perpendicular to the plane of drawing. In this way it is possible to determine a distance between the laser generation device (not shown) and a surface of the piece of baggage 2 and thereby establish a substantially three-dimensional shape of the piece of baggage 2, as is known in the art.

Figure 5:
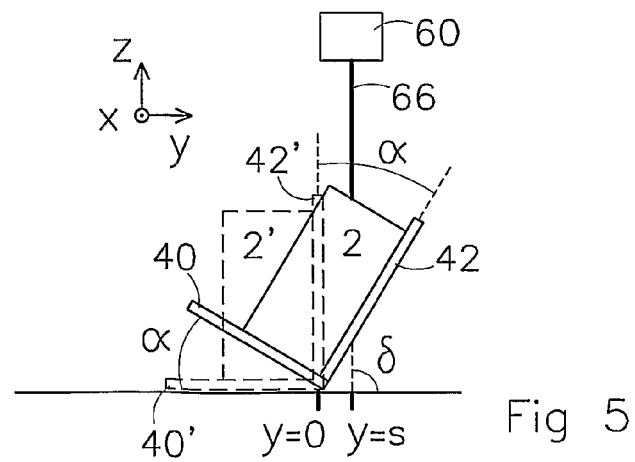
FIG. 5 illustrates diagrammatically an embodiment of a device for use in a second embodiment of a method for scanning with a laser scanning device according to FIG. 4A.

FIG. 5 shows an embodiment of a device for scanning a piece of baggage 2 by means of a laser beam 66, which is generated by a laser generation device 60. It is pointed out that the laser generation device 60 can be arranged differently relative to the piece of baggage 2 by using at least one reflecting element, such as that shown, for example, in FIGS. 4A-4C. In the embodiment shown the laser beam 66 is at an angle 6 relative to a substantially horizontal plane, 6 being, for example, 90°. The device shown can advantageously be used for scanning during the stable positioning of the piece of baggage 2 for conveyance (cf. FIGS. 2C-2D).

In an initial position 2' of the piece of baggage 2, the piece of baggage 2 is positioned on a first conveyor element 40, which is then situated in an initial position 40', against a second conveyor element 42, which is then situated in an initial position 42'. The second conveyor element 42 in its initial position 42' is, for example, positioned substantially vertically at a position $y=0$. The substantially vertical laser beam 66 can be placed at a position $y=s$. The laser beam 66 can sweep along the x-axis, the y-coordinate remaining substantially the same, in order to scan the piece of baggage 2.

From its initial position 2', the piece of baggage 2 can be tilted by means of the first and the second conveyor elements 40, 42 at an increasing angle a, the piece of baggage 2 moving at least partially through the laser beam 66, so that the scanning of the piece of baggage 2 can already be performed at least partially during the tilting movement.

Figures 6A, 6B, 6C:
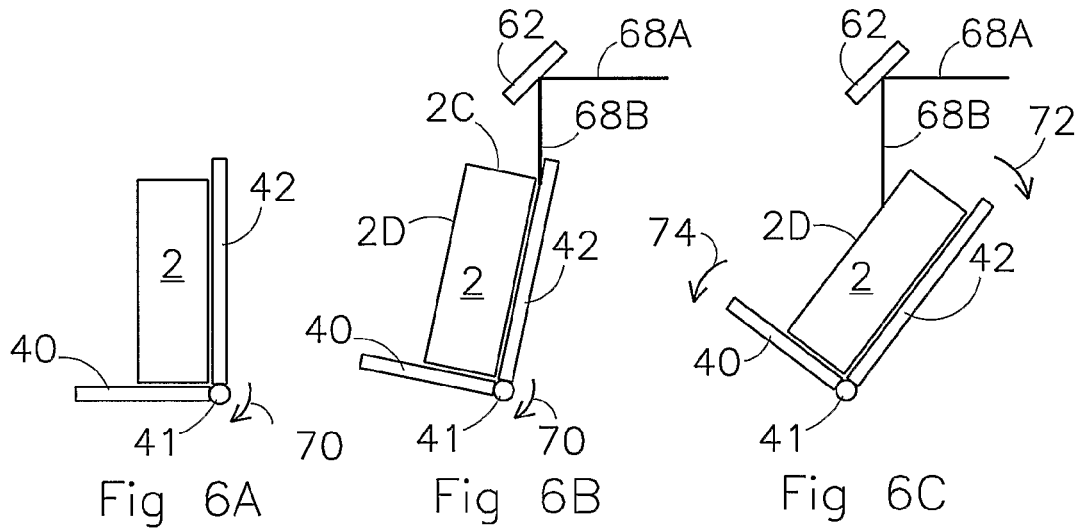
FIGS. 6A-6E illustrate diagrammatically the second embodiment of a method for scanning with a laser scanning device according to FIG. 4A.

Referring now to FIGS. 6A-6E, a method which can be carried out with the device according to FIG. 5 is shown. In FIG. 6A the piece of baggage 2, the first conveyor element 40, the second conveyor element 42 and an axis of rotation 41 are in the initial positions, which are shown in, and described in relation to, FIG. 5. An arrow 70 indicates a direction of rotation.

FIG. 6B shows a first part 68A and a second part 68B of a laser beam, whose direction is changed by a reflecting element 62. A corresponding laser generation device is not shown. Relative to the position shown in FIG. 6A, the first conveyor element 40, the second conveyor element 42, the axis of rotation 41 and the piece of baggage 2 are tilted slightly in the direction of the rotation arrow 70. In the position shown the second part 68B of the laser beam is just short of touching the piece of baggage 2. On further tilting of the piece of baggage 2, the piece of baggage 2 can already be scanned. By comparison with the embodiment shown in FIGS. 4B-4C, in which it is possible to scan one side which is facing the laser beam 68B, in the device and method shown in FIGS. 5 and 6A-6E it is also possible to determine the shape and measurements of two sides 2C, 2D of the piece of baggage 2. During the tilting of the piece of baggage 2, a first side 2C first passes the laser beam 68B and a second side 2D then passes the laser beam 68B, as can be seen in FIG. 6C.

In FIG. 6C the first and the second conveyor elements 40, 42 have reached a position in which they are each positioned at an angle of substantially 45° relative to a virtual horizontal plane. As already shown in, and described in relation to, FIGS. 2C-2D, the first conveyor element 40 can move to a substantially horizontal position as indicated by an arrow 74, and the second conveyor element 42 can move to a substantially horizontal position, as indicated by an arrow 72. While the piece of baggage 2 follows the second conveyor element 42 to a substantially horizontal position, the second side 2D is moved further through the laser beam 68B.

Figures 6D, 6E:
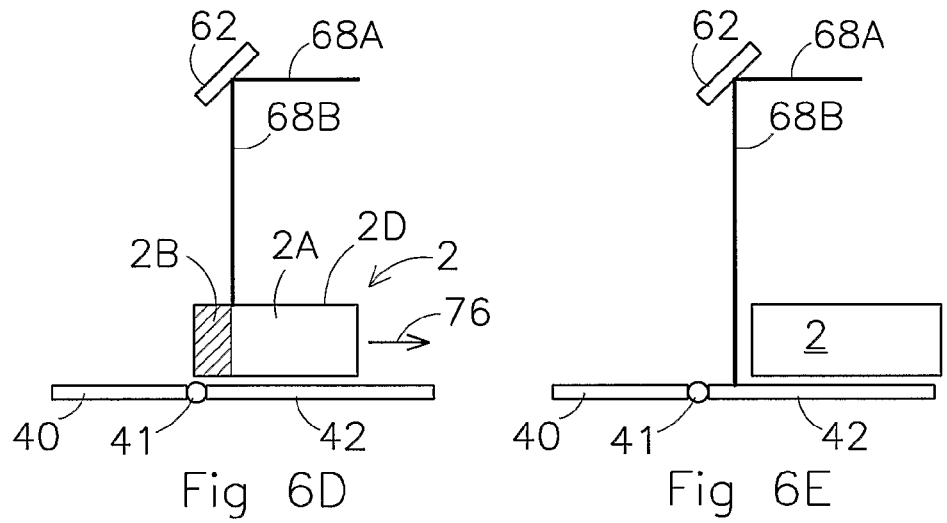

In FIG. 6D the second conveyor element 42 and the piece of baggage 2 are in the horizontal position and a first part 2A of the piece of baggage 2 has been scanned by the laser beam 68B. A second part 2B of the piece of baggage 2 can finally be scanned by moving the piece of baggage 2 in the horizontal direction in the direction of arrow 76, so that in the position shown in FIG. 6E the piece of baggage 2 has been scanned.

Figure 7:
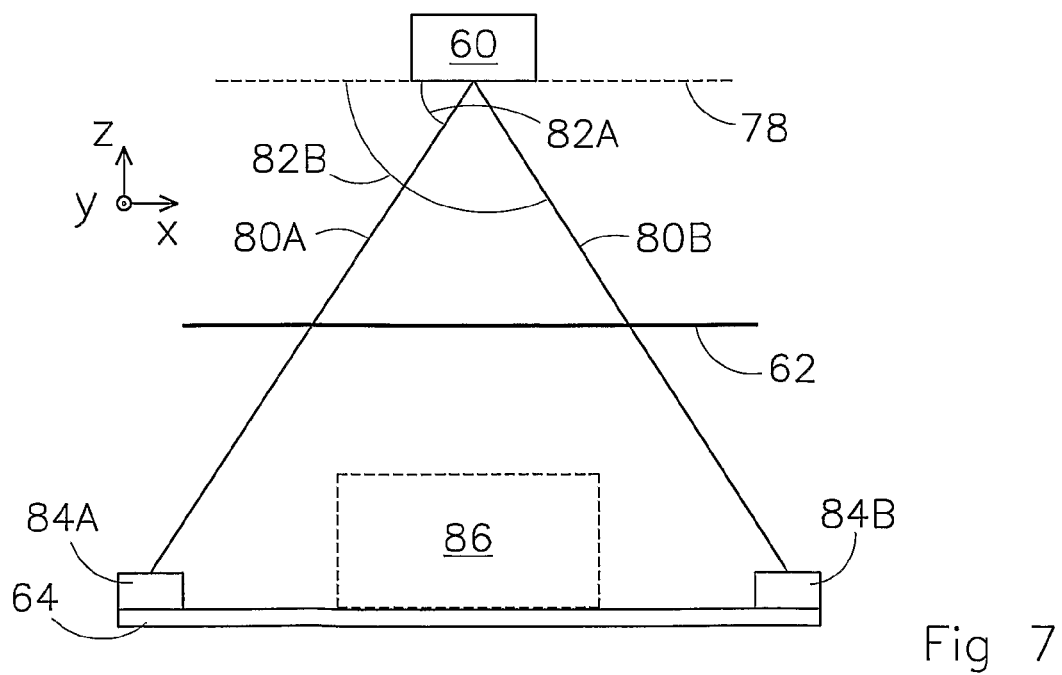
FIG. 7 shows diagrammatically a device and method for calibration of a laser scanning device according to FIG. 4A.

FIG. 7 shows a view in the direction of the y-coordinate. A laser generation device 60 is positioned relative to a surface 64, possibly in combination with a reflecting element 62. An object, for example a piece of baggage, can be positioned at a predetermined scanning location 86. A laser beam for scanning the object sweeps in the direction of the y-coordinate, while the object moves stepwise or continuously in the direction of the y-coordinate. The laser generation device 60 can be configured or calibrated to make the laser beam sweep from a first outermost propagation path 80A to a second outermost propagation path 80B, which propagation paths form an angle 82A, 82B respectively with a virtual line 78, which is substantially parallel to the surface 64. The outermost propagation paths 80A, 80B are preferably mirror symmetrical relative to a central propagation path extending between the laser generation device 60 and a centre of the scanning location 86. Suitable reflectors 84A, 84B for the purpose can be provided for calibration of the outermost propagation paths 80A, 80B.

In one embodiment the laser generation device 60 is not calibrated for the outermost propagation paths 80A, 80B, but the laser generation device 60 limits its distance and remission measurements to the generation paths lying between the outermost propagation paths 80A and 80B, for example on the basis of detection of the striking of one of the reflectors 84A, 84B.

Figure 8A:
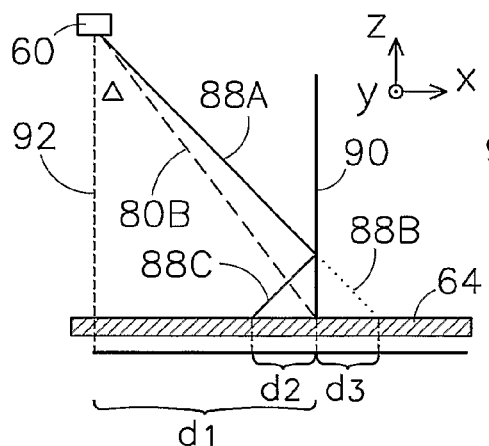
FIGS. 8A-8C illustrate diagrammatically a third embodiment of a laser scanning device.

FIGS. 8A-8D show a further embodiment of a laser generation device. FIG. 8A shows a laser generation device 60 for scanning an object on a surface 64. For this purpose, the laser generation device 60 is equipped to make a laser beam sweep over the surface 64, for example in the direction of an x-coordinate, while an object is moving in the direction of the y-coordinate. In one embodiment it is, of course, also possible to make the laser beam sweep in the direction of the x-coordinate and the y-coordinate, while the object is substantially lying still relative to the laser generation device 60. Only half of the scanning range is shown in FIG. 8A. A laser beam can sweep from a first propagation path 80B to a central propagation path 92, and further to a second propagation path, which is not shown. The first propagation path 80B and the second propagation path are, for example, mirror symmetrical relative to the central propagation path 92. In this way a range which extends over a distance d1 on one side of the central propagation path 92 to a distance d1 on another side of the central propagation path 92 can be scanned.

The device furthermore comprises a mirror element 90 positioned on one side. The mirror element 90 is positioned in such a way that a propagation path 88A which has a greater angle with the central propagation path 92 than with the first propagation path 80B is changed in direction by the mirror element 90. Without mirror element 90, the laser beam would move further along the propagation path 88B, but the mirror element 90 causes the laser beam to go further along the propagation path 88C, in which case the distances d2 and d3 are substantially equal.

Figure 8B:
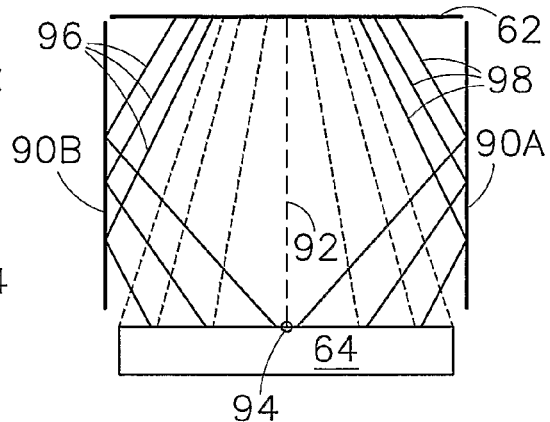
Figure 8C:
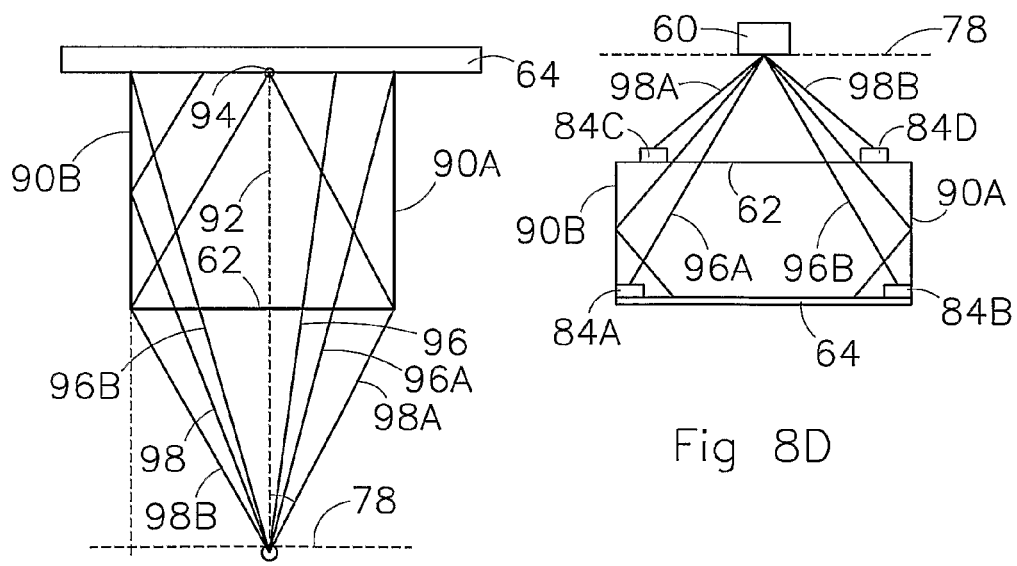

FIG. 8B shows an embodiment in which a laser beam from a laser generation device is first changed in direction by a reflecting element 62 (cf FIGS. 4A-4C). A central propagation path 92 extends between the laser generation device and a centre 94 of a scanning location on a surface 64. A number of direct propagation paths 96 extend between the reflecting element 62 and the surface 64. A number of indirect propagation paths 98 extend from the reflecting element 62 to one of the two mirror elements 90A, 90B and are deflected there to the surface 64. FIG. 8C shows the same embodiment as that shown in FIG. 8B. FIG. 8C furthermore shows a first outermost direct propagation path 96A and a second outermost direct propagation path 96B, which propagation paths are mirror symmetrical relative to the central propagation path 92. FIG. 8C furthermore shows a first outermost indirect propagation path 98A and a second outermost indirect propagation path 98B, which propagation paths are mirror symmetrical relative to the central propagation path 92.

Figure 8D:
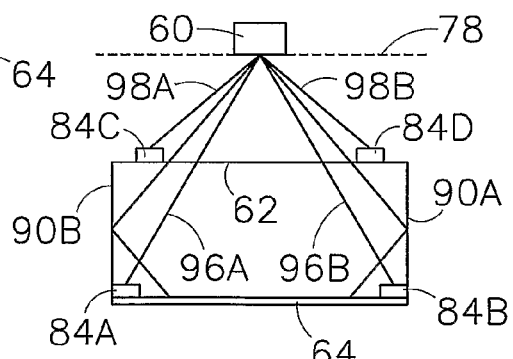
FIG. 8D shows diagrammatically a device and method for calibration of the third embodiment of a laser scanning device according to FIGS. 8A-8C.

FIG. 8D shows that in the embodiment with mirror elements 90A, 90B two further reflectors 84C, 84D can be provided, for example for the calibration of a sweep angle of the laser beam (cf. FIG. 7). For example, a first set of reflectors 84A, 84B can be used to distinguish the direct propagation paths 96 and the indirect propagation paths 98, and there is a second set of reflectors 84C, 84D for the calibration of outermost sweep angles. The term outermost sweep angles refers to the outermost angles at which a measurement is carried out. This therefore means that the actual sweep angle of the laser beam can be greater than the outermost sweep angle.

In the embodiment according to FIGS. 8A-8D it is possible also to scan a side of an object such as a piece of baggage. The direct propagation paths 96 are equipped for scanning an upper substantially horizontal side of the object, while the indirect propagation paths 98 strike the object at a different angle and can consequently also scan a substantially vertical side of the object.

In one embodiment of the device and method of the invention a baggage label, which is affixed by, for example, a user, is also scanned in the receiving room in order to establish, for example, where the piece of baggage is to go, but above all to establish whether the baggage label has been affixed so that it is readable. If radio frequency radiation is used, such as, for example, when an RFID circuit is used, this makes little or no demands on the affixing. If an optical identification sign is used, such as, for example, a barcode, the identification sign must be affixed so as to be optically accessible.

A separate laser scanning device can be provided for scanning an optical identification sign. Such a laser scanning device must, however, focus on the optical identification sign. For automatic focusing, a certain minimum distance between object and laser scanning device is required. If this minimum distance cannot be achieved in a device according to the invention, the laser scanning device for determining a shape and/or measurement of a piece of baggage, such as that shown in FIGS. 9A-9E, can be used.

Figure 9A:
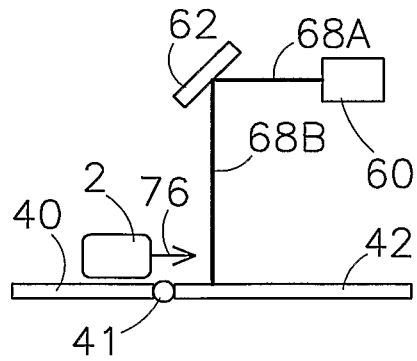
FIGS. 9A-9C illustrate diagrammatically a first embodiment of a device and a corresponding method for focusing a label scanning device.
Figure 9B:
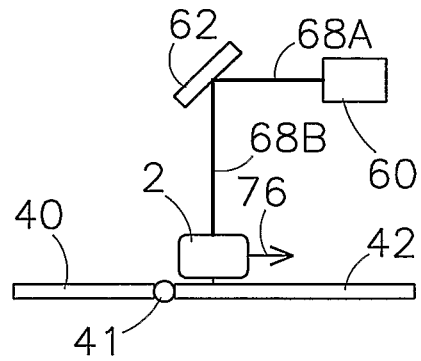
Figure 9C:
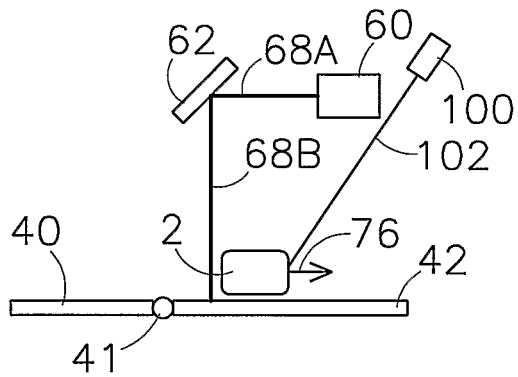

FIGS. 9A-9C show a laser scanning device of the type already shown and described in relation to FIGS. 4B and 4C. The piece of baggage 2 is fed by conveyor elements 40, 42 through a laser beam 68B. Said laser scanning device thereby generates information not only relating to the shape and the size of the piece of baggage 2, but also relating to the position of the piece of baggage 2. Referring to FIG. 9C, the information relating to the position can be used to determine a focal distance 102 between a laser scanning device 100 for scanning an identification sign on a baggage label and the piece of baggage 2. On the basis of the focal distance thus determined, the laser scanning device 100 can be focused.

Figure 9D:
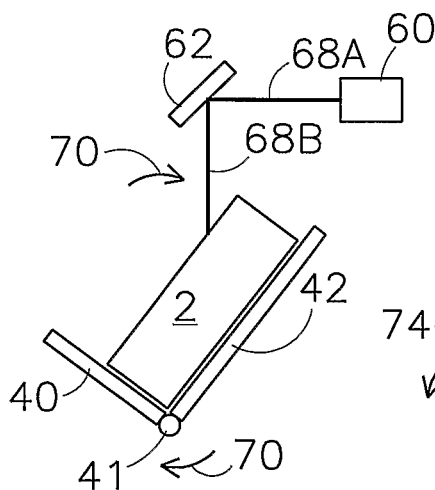
FIGS. 9D-9E illustrate diagrammatically a second embodiment of a device and a corresponding method for focusing a label scanning device.
Figure 9E:
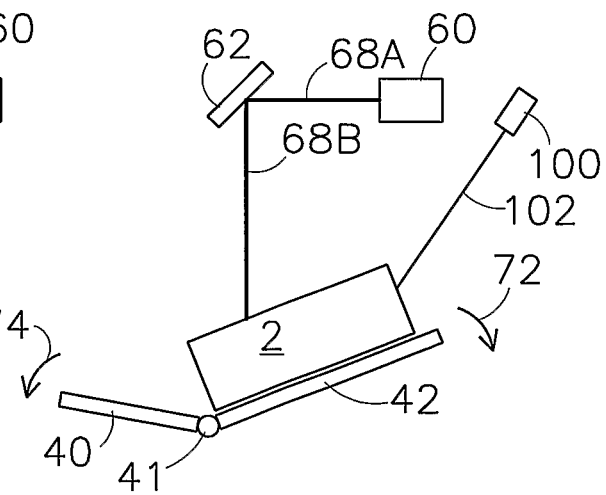

FIGS. 9D-9E show an embodiment of a scanning device of the type already shown and described in relation to FIGS. 5 and 6A-6E. FIG. 9D shows the position in which a distance to an expected location of a baggage label can be determined, in such a way that in the position shown in FIG. 9E an identification sign on the label can be scanned in the correct way after focusing of the scanning device 100 at a focal distance 102.

In a further embodiment the laser scanning information on the shape and measurements of the piece of baggage are combined with information from a photographic image of the piece of baggage. A quantity of reflected laser radiation is determined by an absorption coefficient of the material of the piece of baggage. Said absorption coefficient is determined by the colour of the material and by the absorption properties of the material itself. The photographic image, for example taken with a CCD recording element generally known in the art, can provide information on the colour of the piece of baggage. By combining the colour information from the photographic image with the absorption coefficient detected by the laser scanning device, it is possible to obtain more information on the absorption properties of the material.

It is furthermore pointed out here that use of a photographic image alone for determining a measurement and/or shape can suffice, but that such a method is susceptible to dirt. If dust and other dirt reach the image recording element, there is a great reduction in the accuracy of the method. Furthermore, great processing power is required to abstract the desired information from the two-dimensional image. In addition, good exposure plays an important part. In use at an airport this could lead to many problems, and a laser scanning device offers a solution, since such a scanning device is not susceptible, or at least is less susceptible, to such outside influences.

In another embodiment a baggage label for the receiving device is affixed after infeed of the baggage. The label with identification sign is preferably not affixed until after receipt of all pieces of baggage belonging to the user, and at the moment when all pieces of baggage have already been accepted, in other words at the moment when they have been assessed as being transportable. Such a method ensures that one or more pieces of baggage which have already been furnished with a label do not have to be returned to the user, which can lead to labels being in circulation which are potentially usable for pieces of baggage to be carried.

FIGS. 10A-10D illustrate a specific embodiment of a receiving device 4 for receiving baggage from a passenger at an airport according to the present invention. It is pointed out here again that a receiving device according to the present invention can also be used in other applications.

Figure 10A:
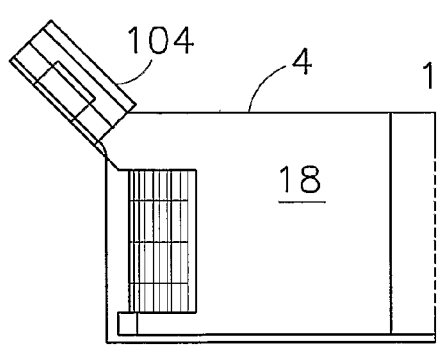
FIGS. 10A-10D illustrate an embodiment of a device according to the invention.
Figure 10B:
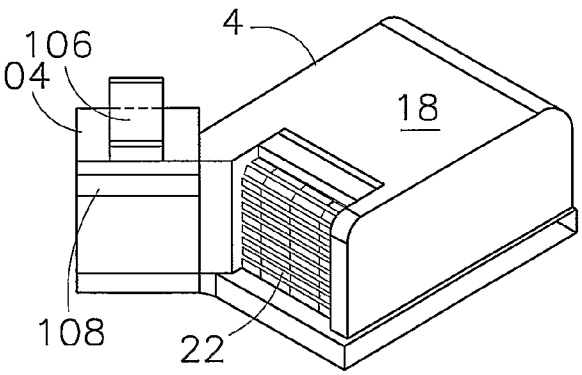
Figure 10C:
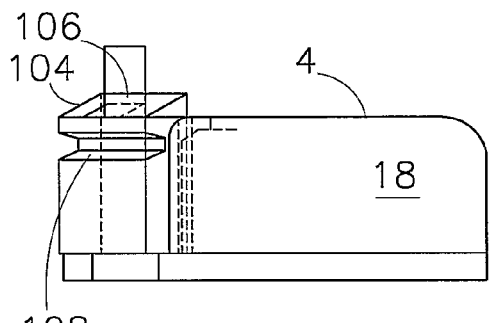
Figure 10D:
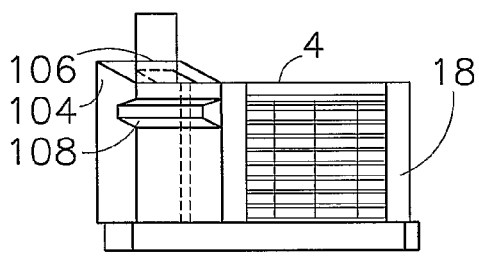

FIG. 10A is a top view of the device 4. FIG. 10B is a perspective front view, and FIGS. 10C-10D are side views. The receiving device 4 comprises a housing 18, in which a receiving room is provided, which receiving room can be closed by means of a closing mechanism 22. Furthermore, the receiving device 4 comprises a control element 104. In the embodiment shown the control element 104 comprises a screen 106 for providing information to a user, in other words a passenger, the screen also possibly being suitable as a touch screen for data input. An area 108 where a user can take a printed baggage label or boarding pass or the like after it has been printed by the receiving device 4 is also provided. An image recording device for taking a photographic image of a passport or other document can also be provided. Such means are already used in self-service devices for checking in at an airport.

Figure 11:
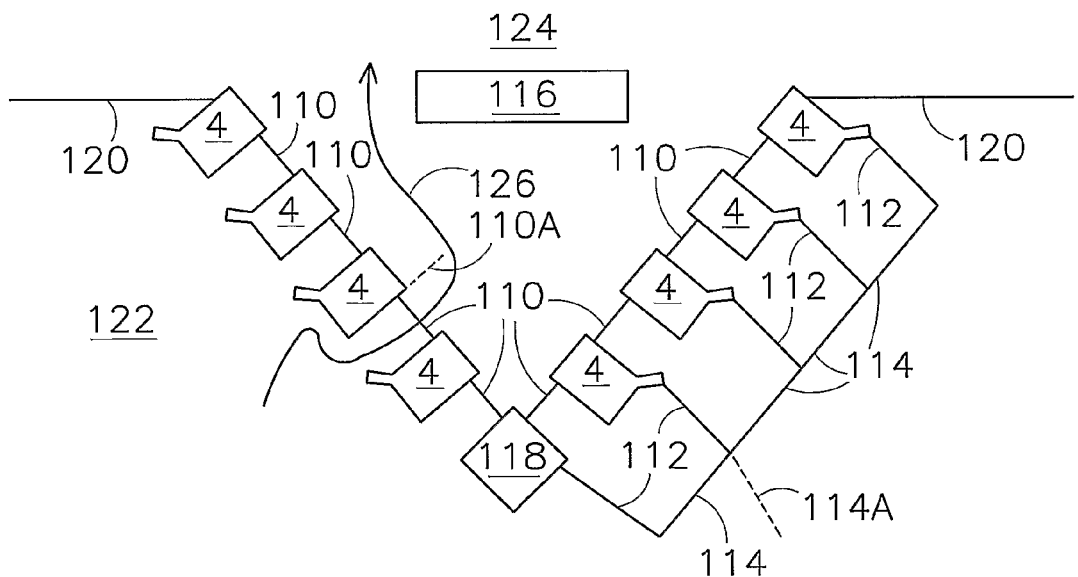
FIG. 11 shows an arrangement of a number of devices according to the invention.

FIG. 11 shows a configuration of a number of receiving devices 4 disposed in a V-shaped formation. Each receiving device 4 is provided with a gate unit 110 which closes a passage, unless the latter is in an opened state 110A. Together with a guard 120, the receiving devices 4 in this configuration form a barrier between, for example, a publicly accessible area 122 and a restricted publicly accessible area 124. The publicly accessible area 122 is accessible to anyone, in other words to staff, passengers and other persons. The restricted publicly accessible area 124 is accessible, for example, only to staff and passengers who have deposited their baggage and have checked in and taken their boarding pass.

A desk 116 is also provided. Personnel to assist the passengers if this proves necessary can be present at the desk 116. Such staff can also be seated at a second desk 118. In another embodiment a border control can also be performed at the desk 116.

Each gate unit 110 is linked to a control element for controlling the gate unit 110 in order to allow through a person in a controlled manner. The device 4 with the gate unit 110 preferably comprises a detection means for detecting a number of persons passing through the gate element 110, which detection means is linked to the control element. In this way it is possible to allow through to the restricted publicly accessible area 124 only the number of persons who have reported to the device 4 and have deposited their baggage.

The device 4 can comprise a second gate element 114, which second gate element 114 is provided on the side at which the publicly accessible area 122 of the first gate element 110 is situated. The control element is then equipped to keep at least one or other of the first gate element 110 and the second gate element 114 in a closed position at all times. That means that if a second gate element 114 is in an opened state 114A, the corresponding first gate element 110 is in a closed position, and vice versa.

By means of guards 112, a cabin is thus formed, in which a number of persons who have reported to the device and have deposited their baggage there can be present. Such a cabin gives more privacy to the persons. Furthermore, such a cabin acts as a lock, in the case of which persons who have deposited their baggage cannot return to the publicly accessible area. Such an embodiment can advantageously be used in relation to security of the area and air traffic.

In the arrangement shown the baggage fed in has to be transported from the receiving room through the floor to a baggage handling area. Existing airport buildings are possibly not structurally prepared for an opening in the floor and are consequently possibly not equipped to bear the weight of the receiving device 4.

Figure 12A:
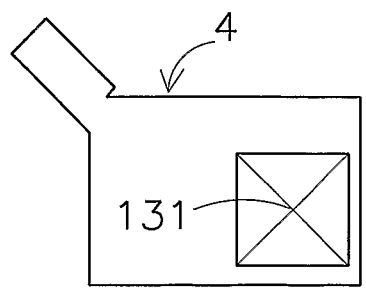
FIGS. 12A-12C illustrate diagrammatically an embodiment of linked devices in a self-supporting construction.
Figure 12B:
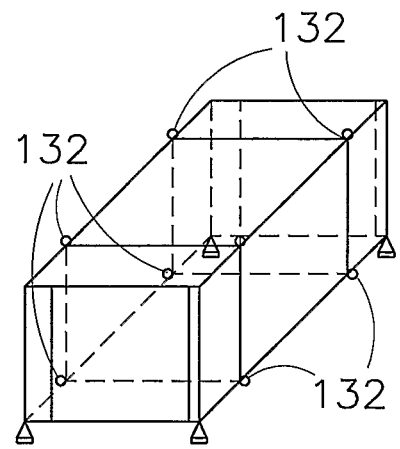
Figure 12C:
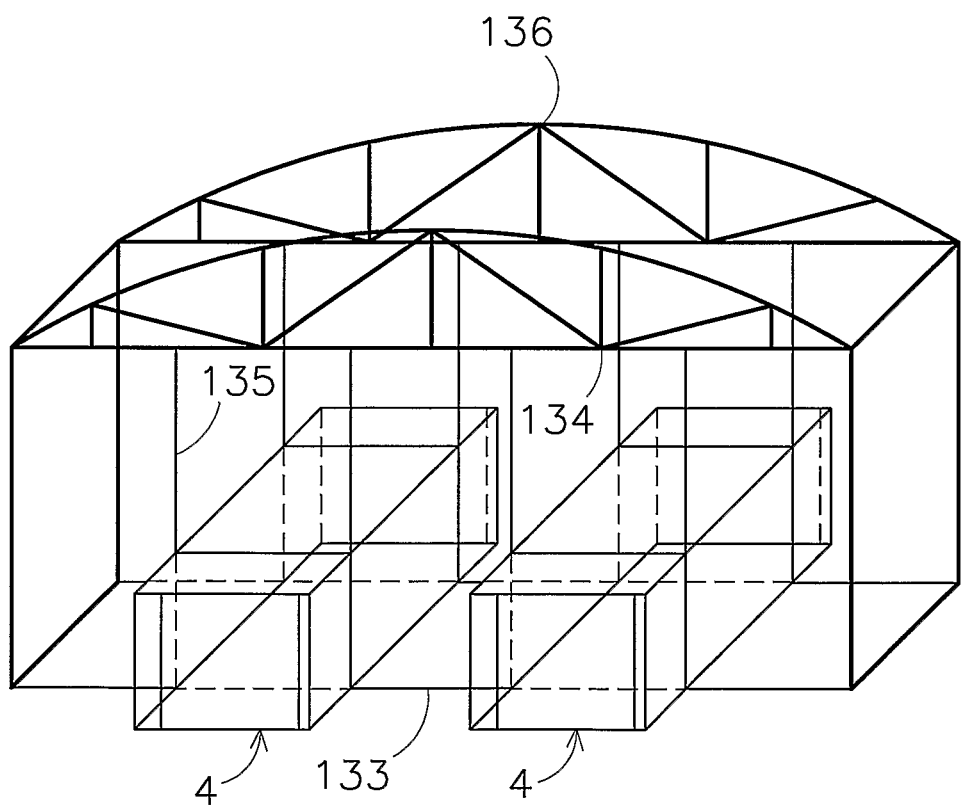

FIG. 12A shows a configuration of a number of receiving devices 4 which are arranged in a line and shows the necessary floor recess 131 in the floor construction of an airport building. In order to ensure that the weight of the receiving devices 4 can be borne, it is possible to connect the devices 4 to each other in such a way that a self-supporting arrangement is obtained. FIG. 12B shows a receiving device 4 in an embodiment with connection points 132 for connecting bars. FIG. 12C shows a configuration of receiving devices 4 which are connected to each other in a line by means of connecting bars 133 and are connected to a girder 134 by means of connecting bars 135, thus together forming a self-supporting lattice structure 136. In such a structure it is then only necessary to provide or already have in existence at a number of points on the floor sufficient bearing power to support the devices 4 accommodated in the self-supporting structure.

FIGS. 13A-13C show a top view of a device according to the invention. In this example the device is provided with a casing 140 in which the removable part 141 is accommodated. The removable part can be, for example, such that it slides out or rolls out, or it can be designed in any other way. Side views which in each case correspond to the top views shown in FIGS. 13A-13C are shown in FIGS. 13D-13F. It is possible for the closing assembly, control electronics, scanners and/or other detection devices, drives for transport and/or the closing mechanism and the like to be fitted in or on the removable part, so that easy accessibility in the case of maintenance can be achieved. In the event of a fault, for example, it is also quick and easy to replace the removable part by another one, after which any repair or maintenance can be carried out elsewhere and/or at another time, for example without causing any inconvenience for passengers in the process. It is also possible for the casing 140 to be designed to accommodate a number of removable parts 141, for example in a row beside each other, in a circle, ring, rectangle, square or in some other way, in which case, for example, a common conveyor can be used for removing the baggage. The casing in this case can also serve as a partition, in order to prevent persons from being able to gain access easily to a non-public part.

It should be understood that the embodiments described are only examples of the invention, which can be embodied in various ways. Therefore specific structural and functional details disclosed here must not be regarded as limiting, but must be seen as only a basis for the claims and as a representative basis for furnishing the person skilled in the art with sufficient information to implement the invention. The terms and phrases used in this description are not intended to be limiting, but to provide an understandable description of the invention.

The term "one" used in this description is defined as one or more than one. The term "number" used in this description is defined as two or more than two. The term "another" used in this description is defined as at least a second or more. The term "comprising" and/or "with" used in this description does not exclude other parts which are not mentioned (i.e. is not limiting). The term "linked" used in this description is defined as connected, not necessarily directly, and not necessarily mechanically.

The invention claimed is:

1. A device for receiving a piece of baggage for transport, the device comprising:
   a receiving room with an infeed opening and a discharge opening and provided with a closing assembly, the closing assembly comprising a closing mechanism,
   a conveyor unit for conveying the piece of baggage from the receiving room through the discharge opening,
   the closing assembly being equipped to
      close the discharge opening of the receiving room prior to opening of the infeed opening of the receiving room in order to feed in the piece of baggage into the receiving room; and
      close the infeed opening of the receiving room prior to opening of the discharge opening in order to discharge the piece of baggage from the receiving room,
   wherein the conveyor unit is configured to articulate in a manner that causes the piece of baggage to be tilted; and
   a laser scanning module for determining a shape and/or measurement of the piece of baggage, the laser scanning module comprising:
      a laser generation device for generating a laser beam;
      a laser detection device for detecting a laser beam and generating a corresponding output signal; and
      a processing unit linked to the laser detection device, for receiving the output signal for generating an image of the piece of baggage on the basis of the output signal, and for determining the shape and/or measurement on the basis of the image,
      wherein the laser beam has a first propagation path, which first propagation path extends substantially between the laser generation device and a centre point of a predetermined scanning location, and wherein the laser scanning module comprises at least a second mirror, which mirror is disposed substantially parallel to the abovementioned first propagation path at a predetermined distance from the abovementioned first propagation path that is such that a laser beam that is deflected from the abovementioned first propagation path can be reflected by the second mirror to the abovementioned centre point of the scanning location so as to provide a second propagation path in this way.

2. A device for receiving a piece of baggage for transport, the device comprising:
   a receiving room with an infeed opening and a discharge opening and provided with a closing assembly, the closing assembly comprising a closing mechanism, and
   a conveyor unit for conveying the piece of baggage from the receiving room through the discharge opening, the conveyor unit having a tiltable conveyor element operative to tilt into a vertical position before the infeed opening is opened, the conveyor element in the vertical position substantially impeding access from the infeed opening to the discharge opening, and the conveyor element further being operative to tilt from the vertical position to a horizontal position after the infeed opening has been closed, the conveyor unit thereby causing the piece of baggage to be tilted, the closing assembly being equipped to
close the discharge opening of the receiving room prior to opening of the infeed opening of the receiving room in order to feed in the piece of baggage into the receiving room; and
close the infeed opening of the receiving room prior to opening of the discharge opening in order to discharge the piece of baggage from the receiving room.

3. The device according to claim 2, wherein the device comprises means for determining measurements of the piece of baggage in at least three dimensions.

4. The device according to claim 2, wherein the conveyor unit near an upstream end has a receiving point for receiving the piece of baggage, and the conveyor unit is equipped to convey the piece of baggage from the receiving point to the receiving room.

5. The device according to claim 4, wherein the device furthermore comprises means for determining a measurement and/or a weight of the piece of baggage when the baggage has been placed at the receiving point.

6. The device according to claim 2, wherein the conveyor unit comprises a first conveyor element and a second conveyor element, the first and second conveyor elements being placed one after the other in a direction of conveyance, and the abovementioned first and second conveyor elements each being capable of tilting in such a way that the first and second conveyor elements can assume an angle relative to each other, which angle can vary at least between 90° and 180°.

7. The device according to claim 2, wherein the receiving room is placed on a floor construction, and wherein the conveyor unit is a lifting device, which is equipped to lower the piece of baggage from the receiving room until at least below the floor construction.

8. The device according to claim 2, wherein the conveyor unit is furthermore equipped to function as a temporary storage facility.

9. The device according to claim 2, wherein the conveyor unit is equipped to convey the piece of baggage to a further conveyor unit.

10. The device according to claim 2, wherein the closing mechanism comprises a sliding door, which sliding door has a first position for closing the discharge opening of the receiving room and has a second position for closing the infeed opening of the receiving room.

11. The device according to claim 2, wherein the device comprises means for checking the readability of a transport label affixed on the piece of baggage.

12. The device according to claim 2, wherein the device is provided with a laser scanning module for determining a shape and/or measurement of the piece of baggage, the laser scanning module comprising:
a laser generation device for generating a laser beam;
a laser detection device for detecting a laser beam and generating a corresponding output signal; and
a processing unit linked to the laser detection device, for receiving the output signal for generating an image of the piece of baggage on the basis of the output signal, and for determining the shape and/or measurement on the basis of the image.

13. The device according to claim 12, wherein the laser scanning module comprises a first minor for deflecting the laser beam generated by the laser generation device, in particular in such a way that a first part of the laser beam and a second part of the laser beam are at an angle of substantially 90° relative to each other.

14. The device according to claim 12 wherein the laser beam has a first propagation path, which first propagation path extends substantially between the laser generation device and a centre point of a predetermined scanning location, and wherein the laser scanning module comprises at least a second mirror, which minor is disposed substantially parallel to the abovementioned first propagation path at a predetermined distance from the abovementioned first propagation path that is such that a laser beam that is deflected from the abovementioned first propagation path can be reflected by the second mirror to the abovementioned centre point of the scanning location so as to provide a second propagation path in this way.

15. The device according to claim 12, wherein the laser scanning module is equipped to scan the piece of baggage while the piece of baggage is tilting about an axis of rotation, which axis of rotation is substantially perpendicular to a first propagation path of the laser beam, which first propagation path substantially extends between the laser generation device and a centre point of a predetermined scanning location.

16. The device according to claim 12, wherein the device furthermore comprises an optical label scanning module for scanning a label on the piece of baggage, the label scanning module comprising an optical element, which optical element is focusable, and the label scanning module being equipped to determine a focusing distance, and the label scanning module being linked to the laser scanning module for receiving the focusing distance.

17. The device according to claim 2, wherein the conveyor unit comprising a conveyor element which is arranged to tilt, the device being arranged to position the conveyor element in a substantially vertical position when the infeed opening is open and to tilt the conveyor element to a substantially horizontal position when the infeed opening has been closed.

18. The device according to claim 2, wherein the conveyor unit comprises a first conveyor element and a second conveyor element, the first and second conveyor elements being placed one after the other in a direction of conveyance,
the first conveyor element being operable to tilt into the horizontal position and the second conveyor element being operable to tilt into the vertical position, respectively, before the infeed opening is opened,
the second conveyor element in the vertical position substantially impeding access from the infeed opening to the discharge opening, and
the first conveyor element being operable to tilt from the horizontal position to the vertical position and the second conveyor element being operable to tilt from the vertical position to the horizontal position, respectively, after the infeed opening has been closed.

* * * * *